(12) United States Patent
Ostrovsky

(10) Patent No.: US 8,711,268 B2
(45) Date of Patent: Apr. 29, 2014

(54) METHODS AND APPARATUSES FOR ANTI-SHADING CORRECTION WITH EXTENDED COLOR CORRELATED TEMPERATURE DEPENDENCY

(75) Inventor: Evgeny Ostrovsky, Petach Tivka (IL)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 302 days.

(21) Appl. No.: 13/067,207

(22) Filed: May 17, 2011

(65) Prior Publication Data

US 2012/0293677 A1    Nov. 22, 2012

(51) Int. Cl.
*G02B 13/16*     (2006.01)
*H04N 5/225*     (2006.01)

(52) U.S. Cl.
USPC ........... 348/335; 348/340; 348/345; 348/348; 348/350; 348/352

(58) Field of Classification Search
USPC .......... 348/335, 340, 345, 348, 349, 350, 352
See application file for complete search history.

(56) References Cited

U.S. PATENT DOCUMENTS

| 7,609,305 B2 | 10/2009 | Fainstain et al. |
| 2005/0225807 A1 | 10/2005 | Fainstain et al. |
| 2006/0045512 A1* | 3/2006 | Imamura et al. .............. 396/225 |
| 2007/0013806 A1 | 1/2007 | Kao |

FOREIGN PATENT DOCUMENTS

| JP | 2006-148881 A | 6/2006 |
| JP | 2008-277926 A | 11/2008 |
| KR | 10-0812730 B1 | 1/2007 |

* cited by examiner

*Primary Examiner* — Yogesh Aggarwal
(74) *Attorney, Agent, or Firm* — Harness, Dickey & Pierce, P.L.C.

(57) ABSTRACT

In a method for correcting shading effects in an image sensor including a plurality of pixels, shading effects on at least one readout pixel of the image sensor are modeled based on a parametric component, and the shading effects on the at least one readout pixel are corrected based on the modeled shading effects. The parametric component is dependent on at least one of a color channel corresponding to the readout pixel and a color correlated temperature of light incident on the at least one readout pixel.

29 Claims, 10 Drawing Sheets
(2 of 10 Drawing Sheet(s) Filed in Color)

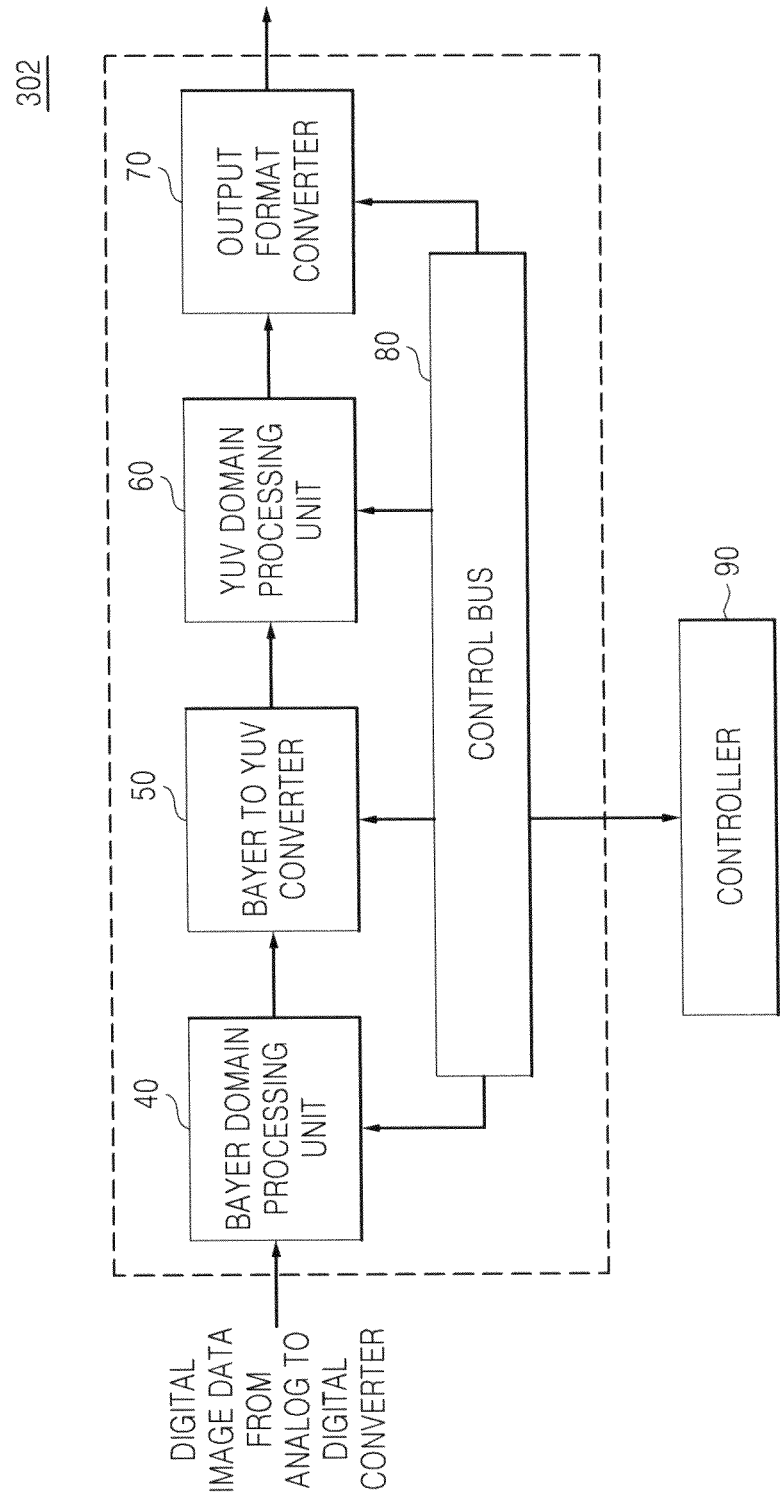

METHODS AND APPARATUSES FOR ANTI-SHADING CORRECTION WITH EXTENDED COLOR CORRELATED TEMPERATURE DEPENDENCY

BACKGROUND

Generally, wide angle optical lenses used in compact digital cameras are prone to significant vignetting or shading. Shading originates from the fact that light is obliquely incident on photosensitive elements located away from the center of the image sensor array, whereas light is substantially perpendicularly incident on photo-sensitive elements located at or near the center of the image sensor. In this example, the obliquely incident light may not completely fall on the remote photosensitive elements and/or may be shaded from the remote photosensitive elements by other structures of the image sensor. To obtain a more accurate representation of an object, the outputs of the pixels at different locations on the image sensor array are processed to compensate for shading effects, which vary across the image sensor array.

Conventionally, anti-shading (AS) algorithms—also referred to as shading correction algorithms—are used to compensate for this shading phenomenon. AS algorithms are based on shading models, which simulate the effects of light shining on a surface.

Conventional shading models assume simple multiplicative dependency between an ideal pixel response (e.g., when detected light is substantially perpendicularly incident upon the central photo-sensitive elements) and a shaded pixel response (e.g., when light incident on the remote photo-sensitive elements does not completely fall on the remote photosensitive elements and/or is shaded from the remote photosensitive elements by other structures of the image sensor). The corrected signal is compensated by multiplying a measured shaded raw signal by some AS gain.

Generally, the coefficient of proportionality between the shaded pixel response and the ideal pixel response is a function of the spatial coordinates of the pixel, the pixel color and the illumination type of the incident light.

A conventional model is commonly applied in connection with the Bayer color filter array. As is known, the Bayer color filter array has 4 color channels: red (R), blue (B), green-red (Gr) and green-blue (Gb). The green-red pixels are green pixels that share the same row with red pixels, whereas the green-blue pixels are green pixels that share the same row as blue pixels.

There are also 7 or 8 basic illumination types. These basic illumination types include: 2 hot or incandescent illumination types (Horizon and warm white (WW)), 5 fluorescent illumination types (IncA, cool white (CW), daylight 5000 k (DL50), daylight 6500 k (DL65) and daylight 7500 k (DL75)) and 1 optional outdoor illumination type. For convenience, the phrase "color correlated temperature" or "CCT" is used instead of illumination type. CCT is given in Kelvins and refers to the particular color of white light; the higher the CCT, the bluer the light appears.

The main target of a conventional AS model is formulated as a function of 4 three-dimensional (3D) gain functions $G_{color}(C_t, x, y)$, which have been multiplied by respective raw pixel values resulting in images with reduced shading effects. In this example, the subscript "color" refers to one of the four color channels: R, B, Gr and Gb. Moreover, $C_t$ refers to the CCT value of the light incident on a given pixel or pixels, and falls within a given range (e.g., [2000K:9000K]). The coordinates (x, y) are the spatial coordinates of the input pixel in the image sensor array. In conventional AS schemes, however, not all components of the shading model are CCT dependent.

SUMMARY

At least some example embodiments provide methods and apparatus for anti-shading correction.

At least one example embodiment provides a method for correcting shading effects in an image sensor including a plurality of pixels. According to at least this example embodiment, shading effects on at least one readout pixel of the image sensor are modeled based on a parametric component, and the shading effects on the at least one readout pixel are corrected based on the modeled shading effects. The parametric component is dependent on at least one of a color channel corresponding to the readout pixel and a color correlated temperature of light incident on the at least one readout pixel.

At least one other example embodiment provides an anti-shading correction apparatus including an image signal processor. The image signal processor is configured to model shading effects on at least one readout pixel of an image sensor based on a parametric component, and configured to correct shading effects on the at least one readout pixel based on the modeled shading effects. The parametric component is dependent on at least one of a color channel corresponding to the at least one readout pixel and a color correlated temperature of light incident on the at least one readout pixel.

According to at least some example embodiments, the parametric component may be a dynamic parametric component that is dependent on the color channel corresponding to the at least one readout pixel. An anti-shading gain function for the color channel corresponding to the readout pixel may be calculated and the shading effects may be corrected using the calculated anti-shading gain function. The shading effects may be corrected by applying the calculated anti-shading gain function to image data corresponding to the at least one readout pixel. The image data may be displayed and/or stored. The dynamic parametric component is a multi-dimensional parametric component.

According to at least some example embodiments, the parametric component may be dependent upon the color correlated temperature of light incident on the at least one readout pixel. A current parametric vector for the color channel corresponding to the at least one readout pixel may be calculated based on the color correlated temperature of the light incident on the at least one readout pixel, and the parametric component may be calculated based on the current parametric vector. The shading effects may be modeled by calculating an anti-shading gain function based on the parametric component, and the shading effects may be corrected using the calculated anti-shading gain function.

The shading effects may be corrected by applying the calculated anti-shading gain function to image data corresponding to the at least one readout pixel.

According to at least some example embodiments, the modeling of the shading effects may also be based on at least one grid component selected from a plurality of grid anti-shading tables. Each grid anti-shading table may correspond to a different range of correlated color temperatures.

At least one other example embodiment provides a method for correcting shading effects in an image sensor including a plurality of pixels. According to at least this example embodiment, at least one grid component is selected from at least one of at least two grid anti-shading tables based on a color correlated temperature of light incident on at least one readout pixel. Each grid anti-shading table corresponds to a different range of correlated color temperatures. Shading effects on the at least one readout pixel are modeled based on the at least one selected grid component, and the shading effects on the at least one readout pixel are corrected based on the modeled shading effects.

At least one other example embodiment provides an anti-shading correction apparatus. According to at least this example embodiment, the apparatus includes an image signal processor configured to: select at least one grid component from at least one of at least two grid anti-shading tables based on a color correlated temperature of light incident on at least one readout pixel, each grid anti-shading table corresponding to a different range of correlated color temperatures; model shading effects on the at least one readout pixel based on the at least one selected grid component; and correct the shading effects on the at least one readout pixel based on the modeled shading effects.

According to at least some example embodiments, the shading effects may be modeled by calculating an anti-shading gain function based on the at least one selected grid component. The shading effects may be corrected by applying the calculated anti-shading gain function to image data corresponding to the at least one readout pixel. The image data may be displayed and/or stored.

A grid component may be selected from each of the at least two grid anti-shading tables, and an interpolated grid component may be calculated based on the selected grid components. In this example, the shading effects may be modeled based on the interpolated grid component. The interpolated grid component may be calculated based on the selected grid components and at least two interpolation weights. The at least two interpolation weights may be determined based on the color correlated temperature of the light incident on the at least one readout pixel.

At least one other example embodiment provides a method for correcting shading effects in image sensors. According to at least this example embodiment, the shading effects in an image sensor are modeled as a function of all color channels of the image sensor, and the shading effects in the image sensor are corrected based on the modeled shading effects.

At least one other example embodiment provides an anti-shading correction apparatus including an image signal processor. The image signal processor is configured to model shading effects in an image sensor as a function of all color channels of the image sensor, and configured to correct the shading effects in the image sensor based on the modeled shading effects.

According to at least some example embodiments, the shading effects may be modeled by calculating an anti-shading gain function as a function of all color channels of the image sensor, and the shading effects may be corrected by applying the calculated anti-shading gain function to each readout pixel of the image sensor. The image data may be displayed and/or stored.

The anti-shading gain function may be calculated based on a current Alpha matrix, which is a function of a plurality of Alpha matrices associated with a set of basic color correlated temperature nodes.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings described herein are for illustrative purposes only of selected embodiments and not all possible implementations, and are not intended to limit the scope of the present disclosure.

FIG. 2 is a block diagram illustrating an example embodiment of an image signal processor according to an example embodiment.

DETAILED DESCRIPTION

Figure 1A:
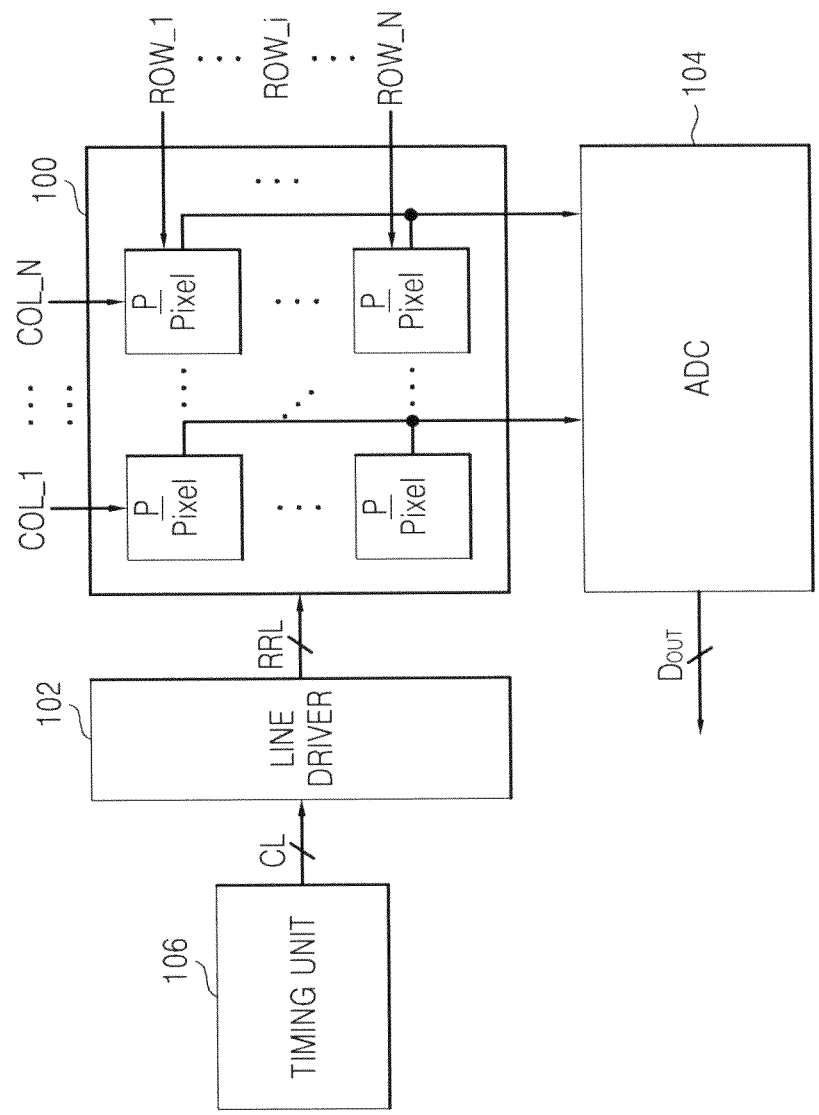
FIG. 1A is a block diagram of a conventional image sensor.

Detailed example embodiments are disclosed herein. However, specific structural and functional details disclosed herein are merely representative for purposes of describing example embodiments. Example embodiments may be embodied in many alternate forms and should not be construed as limited to only the embodiments set forth herein. Moreover, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. The terms are only used to distinguish one element from another. For example, a first element could be termed a second element, and similarly, a second element could be termed a first element, without departing from the scope of this disclosure. As used herein, the term "and/or" includes any and all combinations of one or more of the associated listed items.

When an element is referred to as being "connected" or "coupled" to another element, it may be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

In some alternative implementations, the functions/acts noted may occur out of the order noted in the figures. For example, two figures shown in succession may in fact be executed substantially concurrently or simultaneously or may sometimes be executed in the reverse order, depending upon the functionality/acts involved.

In some cases, portions of example embodiments and corresponding detailed description are described in terms of software or algorithms and symbolic representations of operations performed by, for example, an image signal processor (ISP) or parts thereof. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, at least some example embodiments will be described with reference to acts and symbolic representations of operations (e.g., in the form of flowcharts and/or block diagrams) that may be implemented as program modules or functional processes including routines, programs, objects, components, data structures, etc., which perform particular tasks or implement particular abstract data types and may be implemented in hardware such as ISPs in digital still cameras (DSCs) or the like.

Unless specifically stated otherwise, or as is apparent from the discussion, terms such as "processing," "computing," "calculating," "determining," "displaying" or the like, refer to the action and processes of a computer system, ISP or similar electronic computing device, which manipulates and transforms data represented as physical, electronic quantities within registers and/or memories into other data similarly represented as physical quantities within the memories, registers or other such information storage, transmission or display devices.

Note also that software implemented aspects of example embodiments are typically encoded on some form of tangible computer readable storage medium. The computer readable storage medium may be magnetic (e.g., a floppy disk or a hard drive) or optical (e.g., a compact disk read only memory, or "CD ROM"), and may be read only or random access. Example embodiments are not limited by these aspects of any given implementation.

Example embodiments of methods and apparatuses for anti-shading (AS) correction will be discussed in more detail below. As an example, methods for color correction will be described with reference to a Bayer domain processing unit of an image signal processor (ISP). However, methods similar to those discussed below may be applicable to domains other than the Bayer domain.

FIG. 1A illustrates an example architecture of a conventional complementary-metal-oxide-semiconductor (CMOS) image sensor. The image sensor illustrated in FIG. 1A may be used in, for example, a digital still camera or the like. Though example embodiments of AS correction methods are described with reference to the CMOS image sensor illustrated in FIG. 1A, it will be understood that example embodiments described herein may be used with (or in conjunction with) any device that performs, or is capable of performing, AS correction. For example, in addition to digital still cameras, AS correction methods according to example embodiments may also be used with copiers, scanners, printers, televisions, computer monitors, projectors, mobile phones, smartphones, personal digital assistants (PDAs), etc. The CMOS image sensor illustrated in FIG. 1A will now be discussed in greater detail.

Referring to FIG. 1A, a timing unit (or circuit) 106 controls a line driver 102 through one or more control lines CL. In one example, the timing unit 106 causes the line driver 102 to generate a plurality of read and reset pulses. The line driver 102 outputs the plurality of read and reset pulses to a pixel array 100 on a plurality of select lines RRL.

The pixel array 100 includes a plurality of pixels P arranged in an array of rows ROW_1 through ROW_N and columns COL_1 through COL_N. Each of the plurality of select lines RRL corresponds to a row of pixels P in the pixel array 100. In FIG. 1A, each pixel P may be an active-pixel sensor (APS), and the pixel array 100 may be an APS array. Each pixel P is capable of receiving light and generating an electrical signal based on the received light.

In more detail with reference to example operation of the image sensor in FIG. 1A, read and reset pulses for an $i^{th}$ row ROW_i (where $i=\{1, \ldots, N\}$) of the pixel array 100 are output from the line driver 102 to the pixel array 100 via an $i^{th}$ one of the select lines RRL. In one example, the line driver 102 applies a reset signal to the $i^{th}$ row ROW_i of the pixel array 100 to begin an exposure period. After a given, desired or predetermined exposure time, the line driver 102 applies a read signal to the same $i^{th}$ row ROW_i of the pixel array 100 to end the exposure period. The application of the read signal also initiates reading out of pixel information (e.g., exposure data) from the pixels P in the $i^{th}$ row ROW_i.

Although not shown, the pixel array 100 may also include a color filter array (CFA) following, for example, a Bayer pattern.

The analog to digital converter (ADC) 104 converts output voltages from the $i^{th}$ row ROW_i of readout pixels into a digital signal (or digital code) $D_{OUT}$. The ADC 104 outputs the digital signal $D_{OUT}$ to an image signal processor (not shown in FIG. 1A). The ADC 104 may perform this conversion either serially or in parallel. For example, if the ADC 104 has a column parallel-architecture, the ADC 104 converts the output voltages into the digital signal Dour in parallel.

Figure 1B:
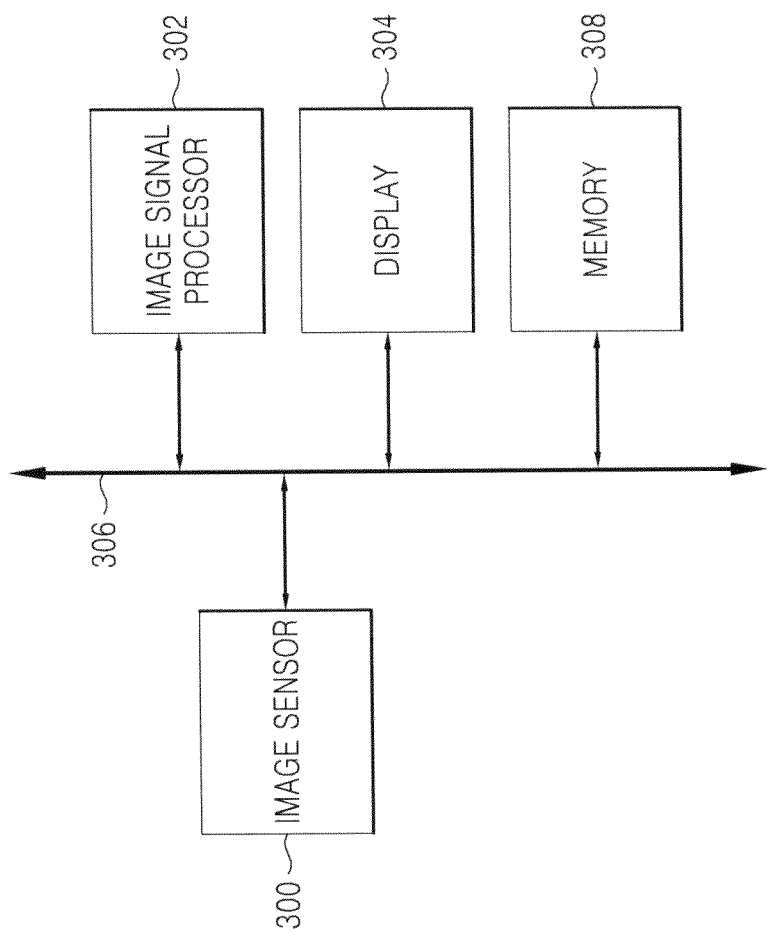
FIG. 1B is a block diagram of an electronic imaging system according to an example embodiment.

FIG. 1B is a block diagram illustrating an electronic imaging system according to an example embodiment.

Referring to FIG. 1B, the electronic imaging system includes, for example: an image sensor 300, an image signal processor (ISP) 302, a display 304 and a memory 308. The image sensor 300, the ISP 302, the display 304 and the memory 308 communicate with one another via a bus 306.

The image sensor 300 may be an image sensor as described above with regard to FIG. 1A. The image sensor 300 is configured to capture image data by converting optical images into electrical signals. The electrical signals are output to the ISP 302.

The ISP 302 processes the captured image data for storage in the memory 308 and/or display by the display 304. In more detail, the ISP 302 is configured to: receive digital image data from the image sensor 300, perform image processing operations on the digital image data, and output a processed image or processed image data. An example embodiment of the ISP 302 will be discussed in greater detail below with regard to FIG. 2.

The ISP 302 may also be configured to execute a program and control the electronic imaging system. The program code to be executed by the ISP 302 may be stored in the memory 308. The memory 308 may also store the image data acquired by the image sensor and processed by the ISP 302. The memory 308 may be any suitable volatile or non-volatile memory.

The electronic imaging system shown in FIG. 1B may be connected to an external device (e.g., a personal computer or a network) through an input/output device (not shown) and may exchange data with the external device.

The electronic imaging system shown in FIG. 1B may embody various electronic control systems including an image sensor, such as a digital still camera. Moreover, the electronic imaging system may be used in, for example, mobile phones, personal digital assistants (PDAs), laptop computers, netbooks, MP3 players, navigation devices, household appliances, or any other device utilizing an image sensor or similar device.

FIG. 2 is a block diagram depicting an example embodiment of the ISP 302 shown in FIG. 1B in more detail.

Referring to FIG. 2, after analog to digital conversion by the ADC 104, a digital representation of the image is generated. This digital representation of the image is in the Bayer domain because the digital representation is in the form of raw color data form and has not been processed to include missing color components. While the term Bayer domain is used to describe the raw color format of the digital image, example embodiments may be used with image sensors using color patterns other than the Bayer pattern (e.g., color patterns using yellow color filters, magenta color filters and the like).

The Bayer domain processing unit (or circuit) 40 reconstructs and/or interpolates missing color components for each pixel based on the digital output from the pixels and an understanding of the color pattern of the color filters in the pixel array. Because each pixel in the pixel array is associated with a particular color channel, only a portion of the red, green and blue light falling on the pixel array is captured. Using demosaicing algorithms (in a process referred to as demosaicing), the Bayer domain processing unit 40 determines missing color components from the outputs of neighboring pixels of the pixel array to obtain a relatively accurate color image from the image sensor. Because demosaicing is generally well-known, a detailed discussion is omitted.

After processing at the Bayer domain processing unit 40, a Bayer to YUV converter 50 translates the image from the Bayer domain, which may be specific to the image sensor, to a more generic (e.g., universal) video standard. In this example, the universal video standard is the YUV video standard. However, the conversion may be to another standard video signal. A YUV domain processing unit (or circuit) 60 then performs further image processing, such as sharpening, white balance, filtering and similar functions on the YUV image.

An output format converter 70 converts the processed YUV image from the YUV domain processing unit 60 into a desired output format for display (e.g., by display 304) and/or storage in a memory (e.g., memory 308).

Still referring to FIG. 2, the components of the image processor shown in FIG. 2 are controlled by a control bus 80. The control bus 80 is configured to program processing parameters of the various units and control the timing of the selection and processing of the inputs and outputs of the components. For example, the control bus 80 may control the scanning of outputs from the pixels of the image sensor that may in turn be processed to form the output image. The control bus 80 may be controlled by a controller 90. The controller 90 may be a processor or processors, a processor component or software capable of being executed by a processor, and the like. The controller 90 may be incorporated on chip with the image sensor or electronic imaging system. Alternatively, the controller 90 may be located off-chip as an independent device.

According to at least some example embodiments, anti-shading (AS) correction may be performed as part of Bayer domain processing at the Bayer domain processing unit 40 shown in FIG. 2. In at least one example embodiment, anti-shading correction may be performed on the digitally converted outputs of the pixels in the pixel array in the Bayer domain prior to demosaicing.

According to at least some example embodiments, the Bayer domain processing performs anti-shading correction by modeling shading effects on one or more readout pixels of an image sensor, and then correcting for the shading effects based on the modeled shading effects. The shading effects may be modeled by calculating an anti-shading gain function, as discussed in more detail below. And, the shading effects may be corrected by applying the calculated anti-shading gain function to image data corresponding to the one or more readout pixels. To correct shading effects on a plurality of pixels (e.g., all or substantially all pixels) of an image sensor, an anti-shading gain function may be applied to image data corresponding to each readout pixel of the image sensor.

Figure 3:
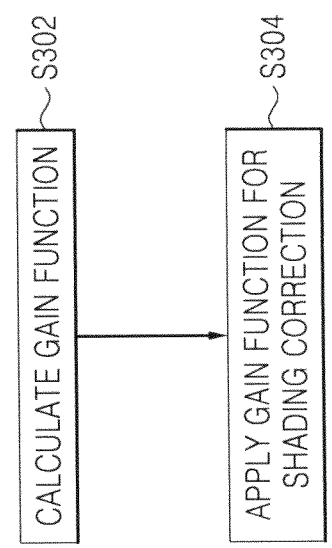
FIG. 3 is a flow chart illustrating a method for anti-shading (AS) correction according to an example embodiment.

FIG. 3 is a flow chart illustrating a method for anti-shading (AS) correction according to an example embodiment. The method shown in FIG. 3 may be performed at the Bayer domain processing unit 40 shown in FIG. 2 and will be described as such. However, example embodiments should not be limited to this example.

Referring to FIG. 3, at S302 the Bayer domain processing unit 40 calculates an AS gain function (also referred to as an "AS profile") for correcting an image captured by an image sensor (e.g., the image sensor shown in FIG. 1A). In one example, the Bayer domain processing unit 40 calculates an AS gain function for each of the red, blue, green-red and green-blue color channels. Example calculations of AS gain functions will be described in more detail below.

At S304, the Bayer domain processing unit 40 applies the calculated AS gain function to each pixel output to compensate for shading effects in the image. In one example, the Bayer domain processing unit 40 applies the AS gain function by multiplying the raw pixel value corresponding to a currently readout pixel by the calculated AS gain function for the color channel corresponding to the currently readout pixel. Because application of an AS gain function is generally known, a detailed discussion is omitted.

A conventional AS gain function (or AS profile) $G_{color}^{Full}$ for a given color channel (e.g., red, blue, green-red and green-blue) is a function of the basic AS profile $G_{color}^{base}$ and a color correlated temperature (CCT) dependent amplitude modulation coefficient $\alpha_{color}(C_t)$ for the particular color channel as shown below in Equation (1).

$$G_{color}^{Full} = 1 + \alpha_{color}(C_t) \cdot G_{color}^{base} \tag{1}$$

The basic AS gain function $G_{color}^{base}$ is determined as a function of a static parametric component $P(R)$ and a grid component $G_{color}^{grid}$ as shown below in Equation (2).

$$G_{color}^{base} = P(R) + G_{color}^{grid} \tag{2}$$

By substituting Equation (2) into Equation (1), the conventional AS gain function $G_{color}^{Full}$ is given by Equation (3) shown below.

$$G_{color}^{Full} = 1 + \alpha_{color}(C_t) \cdot [P(R) + G_{color}^{grid}] \tag{3}$$

In Equations (2) and (3), the parametric component P(R) is common for all color channels, not dependent on the color channel or the color correlated temperature (CCT)). By contrast, the grid component $G_{color}^{grid}$ and the amplitude modulation coefficient $\alpha_{color}(C_t)$ are color dependent. In this example, the parametric component P(R) is a parabolic radially symmetric term given by Equation (4) shown below.

$$P(R) = A \cdot \frac{R^2}{R_{max}^2} \quad (4)$$

In Equation (4), A is a dimensionless parameter varying in the range of [0:4] and $R_{max}^2$ is the square of the radius or distance $R_{max}$ for the most distant pixel from the origin ($x_0$, $y_0$) of the pixel sensor array of the image sensor. The center or origin ($x_0$, $y_0$) is the maximum intensity point in the pixel sensor array.

Still referring to Equation (4), $R^2$ is the square of the distance R from the location of the currently readout pixel (x, y) to the maximum intensity point ($x_0$, $y_0$) in the pixel sensor array. More specifically, the square of the distance R is given by Equation (5) shown below.

$$R^2 = (x-x_0)^2 + (y-y_0)^2 \quad (5)$$

As mentioned above, conventionally, the distance R for calculating the static parametric component P(R) is common for all color channels and CCTs. As a result, the conventional AS gain function $G_{color}^{full}$ does not always provide sufficient accuracy. In one example, the square of the distance R does not provide sufficient accuracy if the shading profile has regions with different convexity signs. Moreover, using the same static parametric component P(R) for all color channels and CCTs may be unnatural and relatively restrictive. For example, the origin ($x_0$, $y_0$) may vary substantially with color channel and different CCT. This leaves little space for choosing a single static parametric component P(R) matching (or substantially matching) all targets. These limitations may result in a less than optimal radial parametric component. And, as a consequence, grid remainders may not be effectively approximated.

According to least one example embodiment, the Bayer domain processing unit 40 calculates an AS gain function as a function of a flexible parametric component $P_{flex}(R)$. The flexible parametric component $P_{flex}(R)$ may be color dependent and flexible enough to enable approximation of all typical shading profiles with a given, desired or predetermined accuracy. As discussed herein, the flexible parametric component $P_{flex}(R)$ may also be referred to as a color-dependent parametric component $P_{flex}(R)$.

In one example, the flexible parametric component $P_{flex}(R)$ is given by a bi-quadratic radial polynomial as shown below in Equation (6).

$$P_{flex}(R) = C \cdot \frac{R^2}{R_{max}^2} \cdot \left(1 + B \cdot \frac{R^2}{R_{max}^2}\right) \quad (6)$$

In Equation (6), C and B are dimensionless parameters that vary in the ranges of [0:8] and [−1:7], respectively. The parameter B defines the type of AS profile, which is discussed below with regard to FIG. 4.

Figure 4:
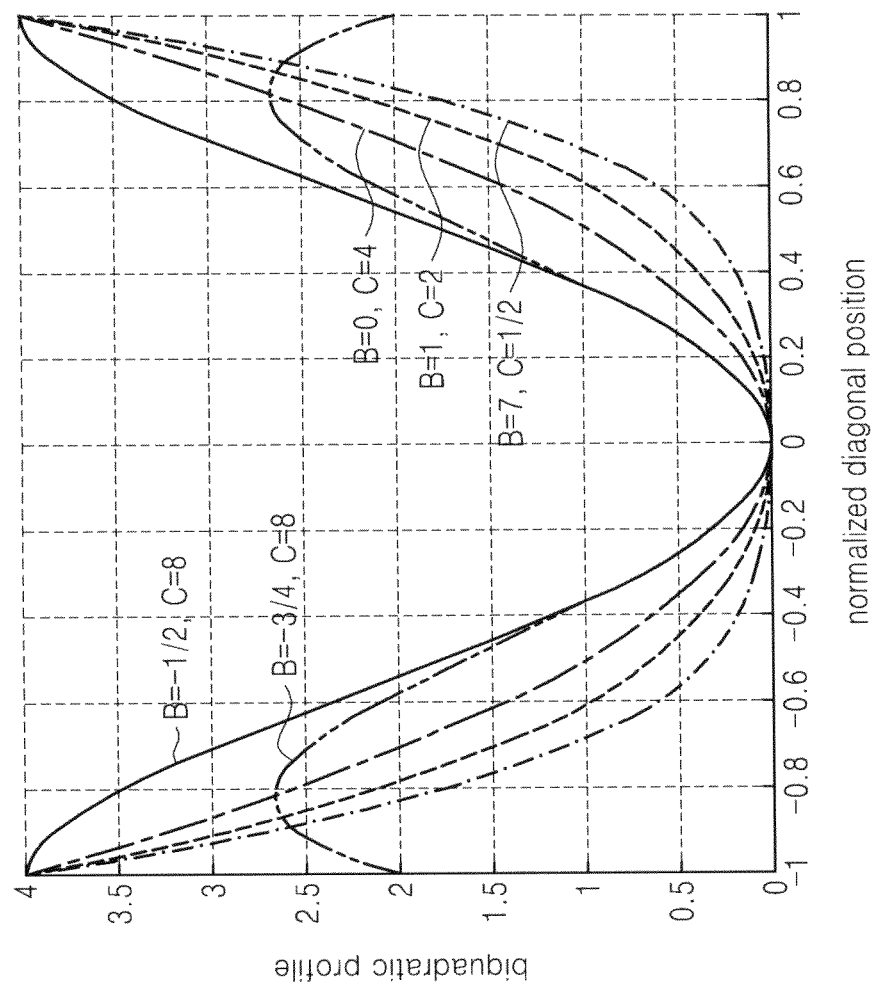
FIG. 4 illustrates example parametric radial profiles for different parameters for explaining an example embodiment.

FIG. 4 illustrates example parametric radial profiles for different parameters.

Referring to FIG. 4, for C=8 and B in the range of [−1:−0.5], the profile of the flexible parametric component $P_{flex}(R)$ has a substantially V-shaped form with 2 internal maxima.

As the value of parameter B increases, the flexible parametric component $P_{flex}(R)$ becomes more cup-shaped as also shown in FIG. 4. In the example discussed with regard to FIG. 4, the upper level of parameter B (e.g., B=7) is/was chosen for certainty. However, example embodiments should not be limited to this example.

The range of the parameter C is defined to maintain the same or substantially the same range of profile values as those provided by Equation (4) discussed above. For example, the maximum value of $$\frac{P_{flex}(R)}{C}$$

in Equation (6) for B=−0.5 is 0.5. So, in order to reach the same or substantially the same maximum as the profile for the flexible parametric component $P_{flex}(R)$, the value of parameter C may be set to 8.

As discussed above, $R^2$ is calculated according to Equation (5). Consequently, by examining Equations (5) and (6) the flexible parametric component $P_{flex}(R)$ for a given color channel is defined by 4 parameters ($x_0$, $y_0$, C, B). For ease of reference, these 4 parameters can be expressed as a four dimensional (4D) parametric vector $\vec{p}_{color}$. Accordingly, the flexible parametric component $P_{flex}(R)$ may be re-written as $P_{flex}(\vec{p}_{color})$.

Referring back to FIGS. 2 and 3, the Bayer domain processing unit 40 calculates the AS gain function $G_{color}^{Full}$ for a given color channel based on the flexible parametric component $P_{flex}(R)$ by replacing the static parametric component P(R) in Equation (3) with the flexible and color dependent parametric component $P_{flex}(R)$ as shown below in Equation (3A).

$$G_{color}^{Full} = 1 + \alpha_{color}(C_t) \cdot [P_{flex}(R) + G_{color}^{grid}] \quad (3A)$$

The Bayer domain processing unit 40 then applies the AS gain function as described above with regard to FIG. 3.

Methods according to at least this example embodiment provide accuracy of about 0.5 leaving about 8 bits for the grid component assuming a unit of 256 bits and assuming 1 bit for indication of the sign (+/−).

As mentioned above, the static parametric component P(R) is also constant for all illumination types; that is, constant and independent of CCT. However, this may result in relatively large grid remainders as well as limitations on accuracy.

According to at least one example embodiment, the Bayer domain processing unit 40 shown in FIG. 2 may calculate an AS gain function $G_{color}^{Full}$ based on an illumination-type (or CCT) dependent parametric component $P_{CCT}(\vec{p}_{color}^{current})$. In this example, the superscript current indicates that the parametric vector $\vec{p}_{color}^{current}$ is calculated by the Bayer domain processing unit 40 by interpolating the basic parametric vectors $\vec{p}_{color}^{j}$ for a currently detected color correlated temperature value $C_t$ for a currently readout pixel. In the following discussion, the notation $\vec{p}_{color}(C_t)$ is used to show the dynamic nature of the parametric component.

In this example, the optimal basic parametric vectors $\vec{p}_{color}^{j}$ are calculated offline and stored in the memory of the image sensor (not shown in FIG. 2, but illustrated, e.g., as 308 in FIG. 1B) for all basic CCTs and separately for all 4 color channels: red (R), blue (B), green-red (Gr) and green-blue (Gb). In addition, the array of detected color correlated temperature values $C_t^j$ is stored in the memory of the image sensor (not shown).

According to at least this example embodiment, the Bayer domain processing unit 40 retrieves the appropriate basic optimal parametric components $\vec{p}_R(C_t)$, $\vec{p}_B(C_t)$, $\vec{p}_{GR}(C_t)$ and $\vec{p}_{GB}(C_t)$ for the color channels red, blue, green-red and green-blue from the memory and calculates the current parametric vector $\vec{p}_{color}^{current}$ by respectively interpolating the retrieved components.

As mentioned above, basic CCTs include: 2 incandescent types (Horizon and IncA), 5 fluorescent types (warm white (WW), cool white (CW), daylight 5000 k (DL50), daylight 6500 k (DL65) and daylight 7500 k (DL75)) and 1 optional outdoor illumination type. As also discussed above, the basic optimal parametric vectors $\vec{p}_{color}^j$ are calculated offline based on empirical (or laboratory) measurement data for respective color correlated temperature values $C_t^j$, where the index j=1, 2, . . . 7 refers to the Horizon, IncA, WW, CW, DL50, DL65 and DL75 illumination types, respectively. For example, 1 refers to Horizon, 2 refers to IncA, 3 refers to WW, and so on.

Figure 5:
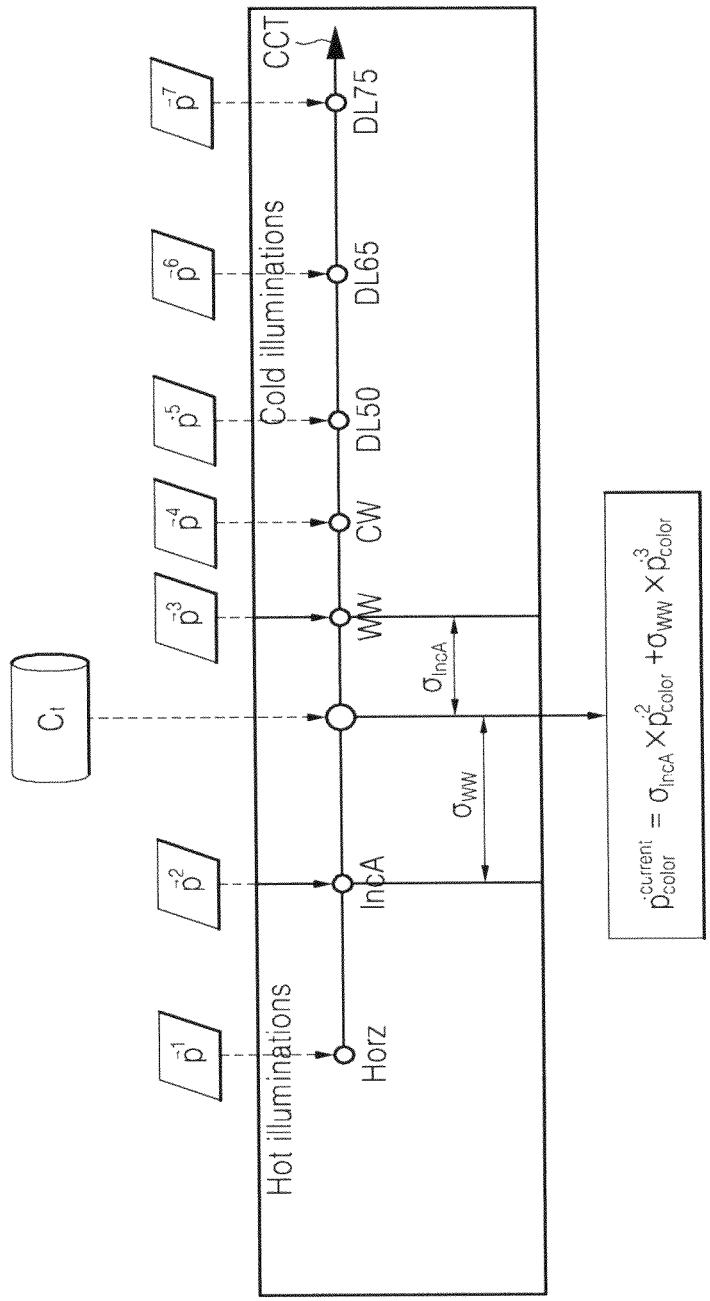
FIG. 5 illustrates an example interpolation of a parametric vector with a current color correlated temperature value for explaining an example embodiment.

FIG. 5 illustrates an example calculation of the current parametric vector $\vec{p}_{color}^{current}$ as a function of basic optimal parametric components $\vec{p}_{color}(C_t)$ by linear interpolation of the set of basic parametric vectors $\vec{p}_{color}^j$ on the grid of basic color correlated temperature values $C_t^j$.

As mentioned earlier, the Bayer domain processing unit 40 calculates a current parametric vector $\vec{p}_{color}^{current}$ for each color channel by interpolating the basic parametric vectors $\vec{p}_{color}^j$ on the CCT grid. In the example shown in FIG. 5, the current color correlated temperature value $C_t$ falls within the range $[C_t^2, C_t^3]$, where $C_t^2$ is the basic color correlated temperature value for the IncA illumination, and $C_t^3$ the basic color correlated temperature value for the WW illumination. In this example, the current parametric vector $\vec{p}_{color}^{current}$ is calculated according to Equation (7) shown below.

$$\vec{p}_{color}^{current} = \sigma_{IncA} \times \vec{p}_{color}^2 + \sigma_{WW} \times \vec{p}_{color}^3 \qquad (7)$$

In Equation (7), $\vec{p}_{color}^2$ is the basic parametric vector corresponding to the color correlated temperature value $C_t^2$, and $\vec{p}_{color}^3$ is the basic parametric vector corresponding to the color correlated temperature value $C_t^3$.

After calculating the current parametric vector $\vec{p}_{color}^{current}$, the Bayer domain processing unit 40 calculates the CCT dependent parametric component $P_{CCT}(\vec{p}_{color}^{current})$ based on the current parametric vectors $\vec{p}_{color}^{current}$ for each color channel. In one example, the Bayer domain processing unit 40 calculates the CCT dependent parametric component $P_{CCT}(\vec{p}_{color}^{current})$ as a function of the current parametric vector $\vec{p}_{color}^{current}$ for each color channel. In a more specific example, the Bayer domain processing unit 40 calculates the CCT dependent parametric component $P_{CCT}(\vec{p}_{color}^{current})$ according to Equations (5) and (6) by substituting the respective parameters of the current vector $\vec{p}_{color}^{current}$ calculated according to Equation (7) for the parameters ($x_0$, $y_0$, C, B).

In this example, the Bayer domain processing unit 40 then determines the AS gain function $G_{color}^{Full}$ based on the CCT dependent parametric component $P_{CCT}(\vec{p}_{color}^{current})$ by replacing the static parametric component $P(R)$ in Equation (3) with the CCT dependent parametric component $P_{CCT}(\vec{p}_{color}^{current})$ as shown below in Equation (8).

The Bayer domain processing unit 40 then applies the AS gain function as described above with regard to FIG. 3.

The CCT dependent parametric component $P_{CCT}(\vec{p}_{color}^{current})$ described above may provide improved flexibility relative to the conventional static parametric component. More specifically, as shown below in Equation (8), the conventional static AS gain function becomes dynamic and CCT dependent by utilizing the CCT dependent parametric component $P_{CCT}(\vec{p}_{color}^{current})$.

$$G_{color}^{Full} = 1 + \alpha_{color}(C_t) \cdot [P_{CCT}(\vec{p}_{color}^{current}) + G_{color}^{grid}] \qquad (8)$$

Thus, contrary to the conventional art, the AS gain function given by Equation (8) is CCT dependent at least in that the AS gain function $G_{color}^{Full}$ is calculated based on a CCT dependent parametric component $P_{CCT}(\vec{p}_{color}^{current})$, which is a function of the CCT of the light incident on the given pixel.

Example embodiments also utilize CCT-dependent grid anti-shading (GAS) tables, which are discussed in more detail below.

To estimate resources, any CCT dependent part of the AS gain function $G_{color}^{Full}$ should be taken into account. A straightforward approach to AS correction includes preparation of 7 or 8 basic sets of grid tables. The number of basic sets of grid tables corresponds to the number of the base CCT nodes. However, this may waste between about 6K and about 25K of memory. Moreover, conventional methods are too static to compensate for shading with desired accuracy over the entire range of CCTs.

Dynamic parametric components described herein maintain grid remainders within about the [−0.5:0.5] range, which allows for resource conservation with respect to the grid component. However, meeting final accuracy requirements are not guaranteed because of the differences between incandescent and fluorescent illuminations. Because of these differences, the grid remainders associated with the grid component $G_{color}^{grid}$ of AS gain functions are not highly correlated.

Figure 6:
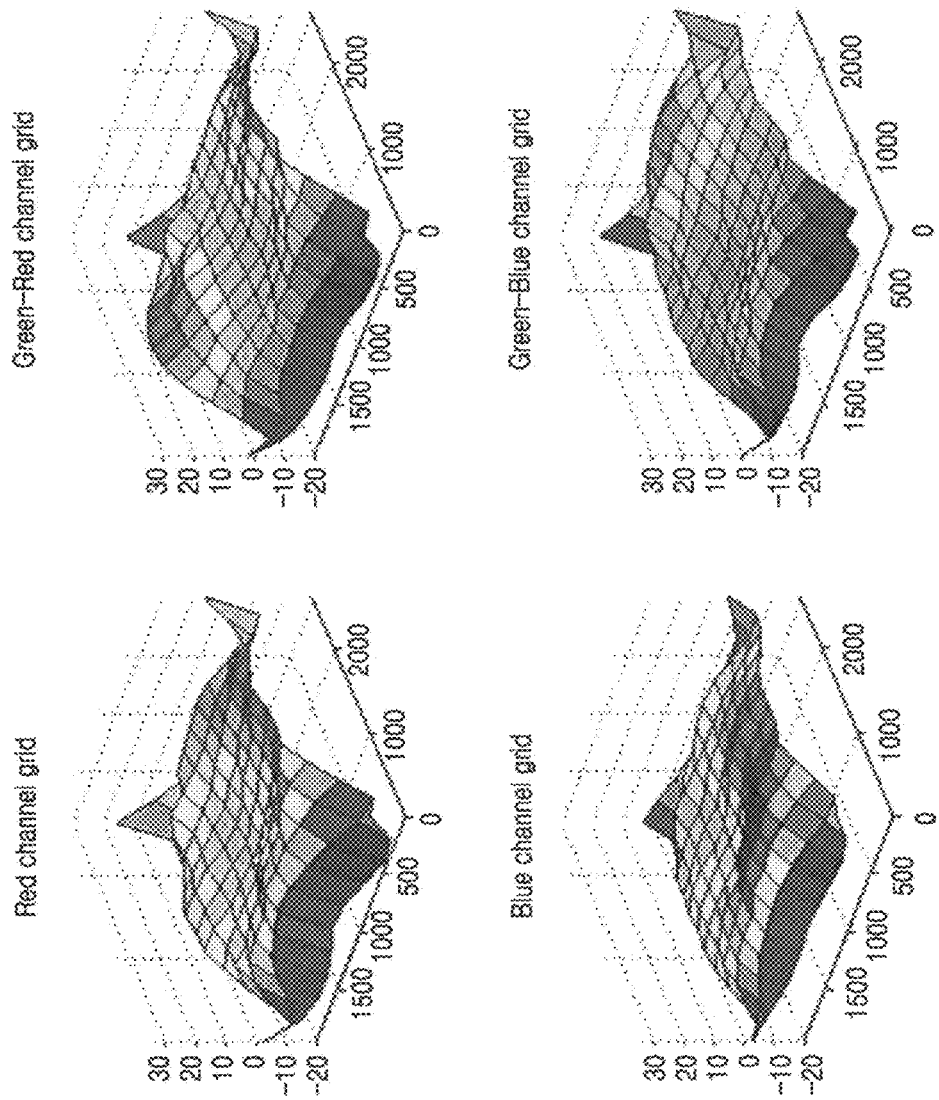
FIG. 6 illustrates an example hot grid table.
Figure 7:
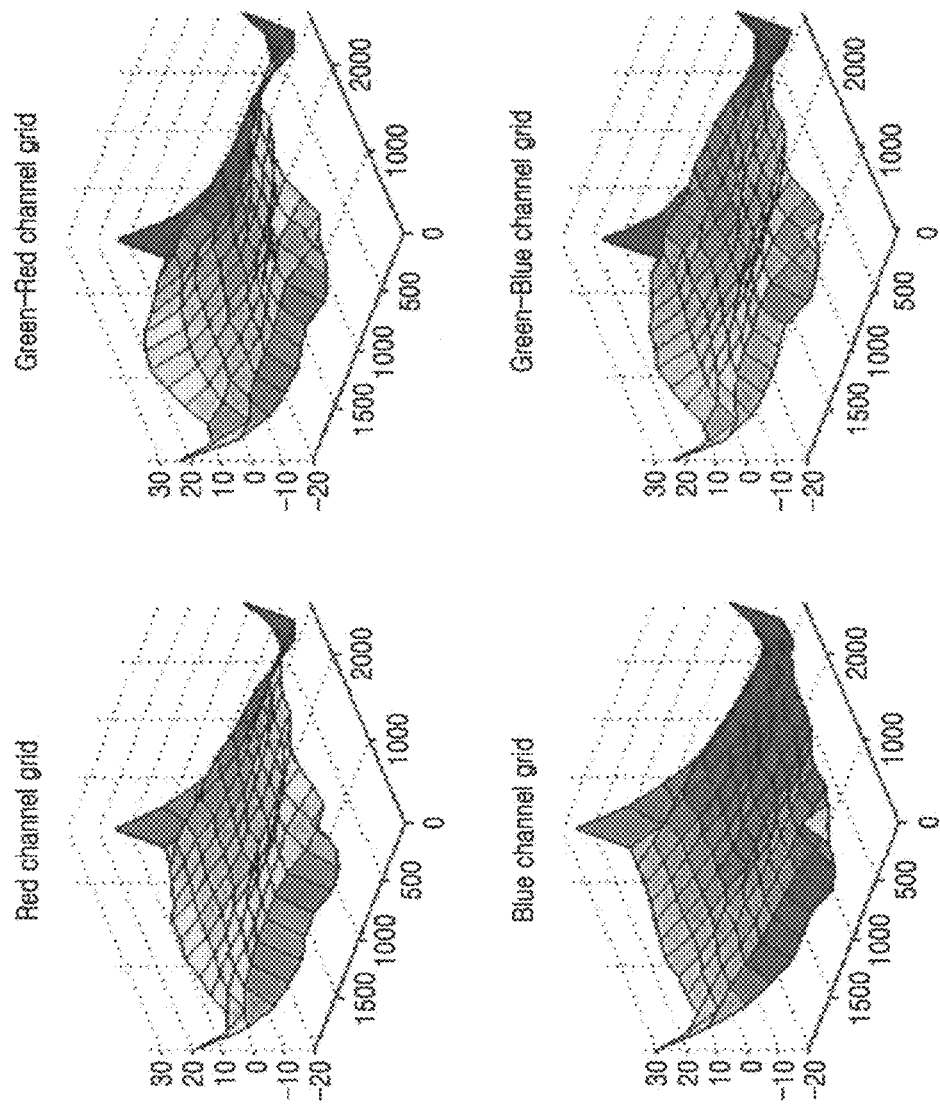
FIG. 7 illustrates an example cold grid table.

FIG. 6 illustrates a graphical representation of an example hot grid table, and FIG. 7 illustrates a graphical representation of an example cold grid table in accordance with at least some example embodiments. The tables shown in FIGS. 6 and 7 were calculated for a sensor with a resolution of 2608×1960. The units of the grid components are 1/256 part of the AS gain. Each of FIGS. 6 and 7 shows a graph for each color channel of the image sensor (e.g., R, B, Gr, Gb).

Referring to FIGS. 6 and 7, the hot and cold grid tables differ both numerically and in behavior. As one can appreciate, the grid component variation is between about 10% and about 20% of the full AS gain range. And, even intermediate inaccuracies in grid definition may cause between about 5% and about 10% errors in the overall gain, which may result in relatively significant residual shading.

According to at least one example embodiment, a hot grid table and a cold grid table are utilized in calculating the grid component $G_{color}^{grid}(C_t)$ of the AS gain function $G_{color}^{Full}$. The hot and cold grid tables may be stored in the memory 308 shown in FIG. 1B, in the memory of the image sensor or any other suitable memory.

In one example, if the CCT of light incident on the readout pixel is within a "hot zone," then the Bayer domain processing unit 40 selects an entry $G_{color}^H$ from the hot grid table as the grid component $G_{color}^{grid}(C_t)$. The selected grid component corresponds to the color channel of the currently readout pixel. That is, for example, $Gr_{color}^{grid}(C_t)=G_{color}^{H}$.

If, on the other hand, the CCT of incident light is within a "cold zone," then the Bayer domain processing unit 40 selects an entry $G_{color}^{C}$ from the cold grid table as the grid component $G_{color}^{grid}(C_t)$. That is, for example, $G_{color}^{grid}(C_t)=G_{color}^{C}$.

If the CCT of the incident light lies in a "transition zone," then the Bayer domain processing unit 40 calculates the grid component $G_{color}^{grid}(C_t)$ through interpolation as will be discussed in more detail below. Each of the hot zone, the cold zone and the transition zone will also be described in more detail below.

Figure 8:
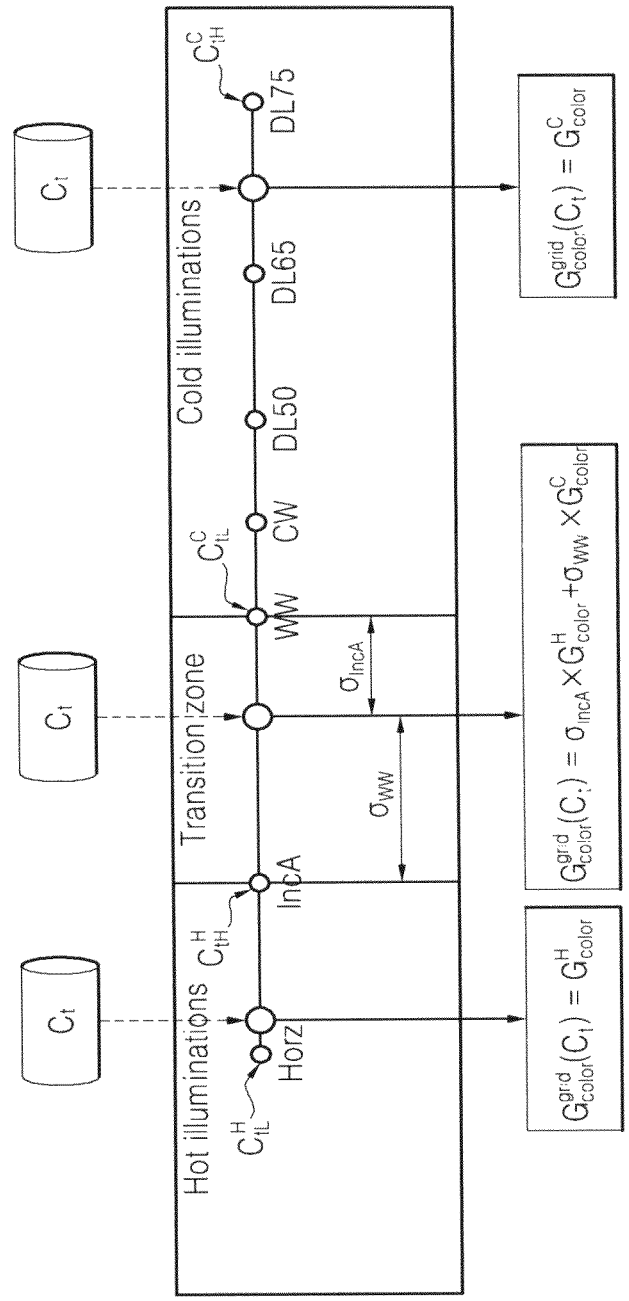
FIG. 8 illustrates an example grid component calculation based on color correlated temperature (CCT) spectrum for explaining an example embodiment.

FIG. 8 illustrates an example CCT spectrum showing an example hot zone, transition zone and cold zone from left to right.

As shown in FIG. 8, the hot zone of the CCT spectrum includes color correlated temperature values $C_t$ falling between the color correlated temperature values for incandescent illuminations Horz and IncA. In more detail with regard to FIG. 8, the hot zone includes CCTs falling within the range $[C_{tL}^{H}, C_{tH}^{H}]$, where color correlated temperature value $C_{tL}^{H}$ is the color correlated temperature value for the Horz illumination, and $C_{tH}^{H}$ is the color correlated temperature value for the IncA illumination.

The cold zone of the CCT spectrum includes color correlated temperature values falling between fluorescent illuminations WW and DL75, which includes illumination types CW, DL50 and DL65. In more detail with regard to FIG. 8, the cold zone includes color correlated temperature values $C_t$ falling within the range $[C_{tL}^{C}, C_{tH}^{C}]$, where $C_{tL}^{C}$ is the color correlated temperature value for the WW illumination, and $C_{tH}^{C}$ is the color correlated temperature value for the DL75 illumination.

The transition zone of the CCT spectrum shown in FIG. 8 includes color correlated temperature values falling between the fluorescent illumination IncA and the incandescent illumination WW. In more detail with regard to FIG. 8, the transition zone includes color correlated temperature values falling between $C_{tH}^{H}$ and $C_{tL}^{C}$, where $C_{tH}^{H}$ is less than $C_{tL}^{C}$.

Still referring to FIG. 8, if the current color correlated temperature value of light incident on a currently readout pixel is within a temperature range for hot illuminations $[C_{tL}^{H}, C_{tH}^{H}]$, that is $C_{tL}^{H} \leq C_t \leq C_{tH}^{H}$, then the Bayer domain processing unit 40 selects the grid component $G_{color}^{grid}(C_t)$ from the GAS table for hot illuminations. In this example, the Bayer domain processing unit 40 sets the grid component $G_{color}^{grid}(C_t)$ equal to $G_{color}^{H}$, which is a value selected from the hot grid table.

On the other hand, if the current color correlated temperature value of light incident on a currently readout pixel is within a temperature range for cold illuminations $[C_{tL}^{C}, C_{tH}^{C}]$, that is $C_{tL}^{C} \leq C_t \leq C_{tH}^{C}$, then the Bayer domain processing unit 40 selects the grid component $G_{color}^{grid}(C_t)$ from the GAS table for cold illuminations. In this example, the Bayer domain processing unit 40 sets the grid component $G_{color}^{grid}(C_t)$ equal to $G_{color}^{C}$, which is a value selected from the cold grid table.

But, if the current correlated color temperature value of light incident on a currently readout pixel is in the transition zone between an upper bound $C_{tH}^{H}$ of the temperature range for hot illuminations and an lower bound $C_{tL}^{C}$ of the temperature range for cold illuminations, that is $C_{tH}^{H} \leq C_t C_{tL}^{C}$, then the Bayer domain processing unit 40 calculates the grid component $G_{color}^{grid}(C_t)$ by linear interpolation based on the closest color correlated temperature values $C_t$ in the hot and cold zones.

FIG. 8 shows the color correlated temperature value $C_t$ in the transition zone between the color correlated temperature value for the IncA illumination (denoted $C_{tH}^{H}$) and the color correlated temperature value for the WW illumination (denoted $C_{tL}^{C}$). In this example, the transitional grid component $G_{color}^{grid}(C_t)$ is calculated according to Equation (9) shown below.

$$G_{color}^{grid}(C_t) = \sigma_{IncA} \times G_{color}^{H} + \sigma_{WW} \times G_{color}^{C} \quad (9)$$

In Equation (9), each of $\sigma_{IncA}$ and $\sigma_{WW}$ are interpolation weights for the incandescent illumination IncA and the fluorescent illumination WW, which satisfy the condition $\sigma_{WW} + \sigma_{IncA} = 1$. The interpolation weights $\sigma_{IncA}$ and $\sigma_{WW}$ may be adjusted accordingly based on where the current color correlated temperature value $C_t$ is located in the transition zone.

In this example, the Bayer domain processing unit 40 then calculates the AS gain function $G_{color}^{Full}$ based on the grid component $G_{color}^{grid}(C_t)$ by replacing the conventional grid component $G_{color}^{grid}$ in Equation (3) with the grid component $G_{color}^{grid}(C_t)$ described above as shown, for example, in Equation (10).

The Bayer domain processing unit 40 then applies the AS gain function as described above with regard to FIG. 3.

According to the example embodiment discussed with regard to FIG. 8, the grid component is split into two or more tables. By splitting the grid component into two or more tables, the AS gain function $G_{color}^{Full}$ becomes more dynamic with regard to illumination type as shown below in Equation (10).

$$G_{color}^{Full} = 1 + \alpha_{color}(C_t) \cdot [P(\vec{p}_{color}) + G_{color}^{grid}(C_t)] \quad (10)$$

In Equation (10), the CCT dependent parametric component $P_{CCT}(\vec{p}_{color}^{current})$ and the grid component $G_{color}^{grid}(C_t)$ are used in calculating a more dynamic AS gain function $G_{color}^{Full}$.

Due to byte-per-element allocation, GAS tables may occupy about half of the memory required for conventional tables of the same or similar size. In addition, the reduction by about 2 bits provides hardware savings. For irregular shading shapes for which 8-bit format may be too restrictive to cover variability of an ideal AS profile, the grid component range may be expanded by the grid scale factor with a reduction in accuracy.

As discussed above, the conventional AS gain function is also dependent on respective amplitude modulation coefficients $\alpha_{color}(C_t)$ for each color channel. Conventionally, these coefficients used in conventional methods are the sole manner in which to adjust the current illumination type. Although AS gain functions described herein are CCT dependent, additional linear correction may be advantageous. Such correction is substantially constant over most of the CCT range.

At least one example embodiment accounts for all color channel combinations. By contrast, conventional AS models perform separate channel adjustment utilizing only diagonal matrices. The cross-channel correction involving all color channel combinations provides a closer approximation of the target AS profile.

At least one example embodiment provides linear correction by replacing the amplitude modulation coefficient $\alpha_{color}(C_t)$ with an Alpha matrix $A(C_t)$ as shown below in Equation (11).

$$\vec{G}^{Full} = 1 + A(C_t) \cdot [\vec{P}(C_t) + \vec{G}^{grid}(C_t)] \quad (11)$$

In Equation (11), A is the current matrix (e.g., 4×4 matrix) of the cross-channel correction. This matrix is sometimes referred to as the Alpha matrix. The upper arrow denotes the vector-function given by Equation (12) shown below.

$$\vec{F} = \begin{bmatrix} F_R \\ F_{Gr} \\ F_{Gb} \\ F_B \end{bmatrix}(x, y) \quad (12)$$

The current Alpha matrix is interpolated using a set of the basic Alpha matrices.

Generally, Alpha matrix correction compensates for stationary grid components within certain segments of the CCT range.

In one example, a relatively simple amplitude modulation corresponds to the diagonal matrix $A(C_t)$. Using the notation of Equation (11), the diagonal matrix $A(C_t)$ may be expressed by Equation (13) shown below.

$$A(C_t) = \begin{pmatrix} \alpha_{red}(C_t) & & & \\ & \alpha_{gr}(C_t) & & \\ & & \alpha_{gb}(C_t) & \\ & & & \alpha_{blue}(C_t) \end{pmatrix} \quad (13)$$

In the case of a full Alpha matrix $A(C_t) = \{\alpha_{i,j}\}$, a relatively simple modulation is combined with linear correction of the color gain by each of the other color channels. In one example, by denoting the color channels by numbers 1 to 4, the AS gain function for the $1^{st}$ color channel can be written as shown below in Equation (14).

$$G_1^{Full} = 1 + \alpha_{11} \cdot F_1 + \alpha_{12} \cdot F_2 + \alpha_{13} \cdot F_3 + \alpha_{14} \cdot F_4 \quad (14)$$

In Equation (14), $F_j$ is the AS profile for the $j^{th}$ color channel, and is given by Equation (15) shown below. In Equation (15), the color correlated temperature value $C_t$ is omitted for simplicity.

$$F_j = P_j + G_j^{grid} \quad (15)$$

The non-diagonal coefficients $\alpha_{i,j}$ in the Alpha matrix are indicative of what portion of the $j^{th}$ color channel profile $F_j$ should be added to or removed from the $i^{th}$ color channel profile to bring the calculated profile closer to an ideal profile. In some cases, the cross-channel Alpha matrix may be seen as an element of pixel crosstalk correction. The cross-channel Alpha matrix correction may enable approximation of the ideal AS profile, which is improved relative to a profile determined with relatively simple amplitude modulation. Moreover, example embodiments more effectively use available information at a relatively low cost of 4-parametric vector linear combinations calculation.

Generally, only Alpha matrices for some basic nodes of the CCT are known, and interpolation may be used to propagate these known Alpha matrices for all CCT values in a given range. An example interpolation will be discussed in more detail below with regard to FIG. 9, which shows an example interpolation of an Alpha matrix $\alpha_y^{c_t}$ corresponding to a current color correlated temperature value $C_t$. The interpolation discussed herein may be performed at the Bayer domain processing unit 40.

Figure 9:
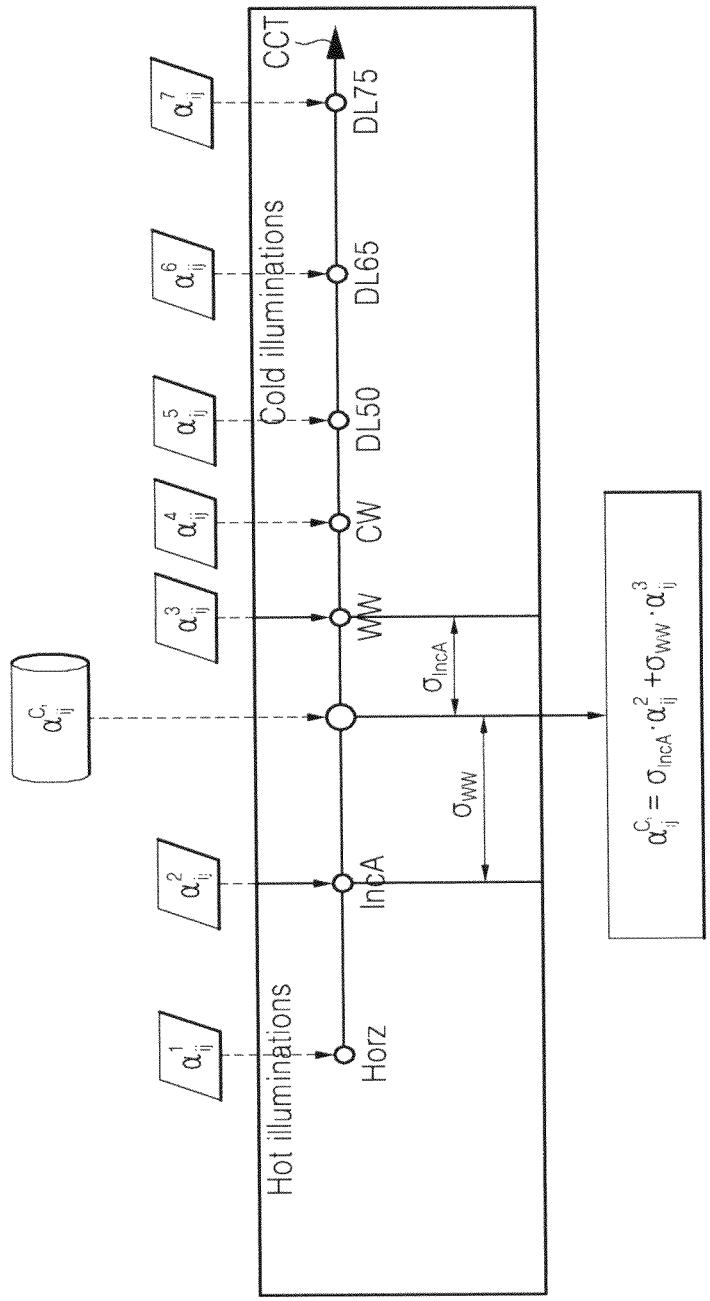
FIG. 9 illustrates an example interpolation of an Alpha matrix with a current color correlated temperature value for explaining an example embodiment.

FIG. 9 shows Alpha matrices $\alpha_y^1, \alpha_y^2, \ldots, \alpha_y^7$ for the 7 basic CCT nodes Horz, IncA, WW, CW, DL50, DL65 and DL75. In FIG. 9, piecewise linear interpolation is used to determine the Alpha matrix $\alpha_y^{c_t}$ when the current color correlated temperature value falls between the $2^{nd}$ basic node (IncA) and the $3^{rd}$ basic node (WW). In other words, FIG. 9 shows example interpolation of the Alpha matrix $\alpha_y^{c_t}$ for the color correlated temperature value $C_t$ in the above-described transition zone between the color correlated temperature value $C_{tH}^H$ for the IncA illumination and the color correlated temperature value $C_{tL}^C$ for the WW illumination.

In the example shown in FIG. 9, the linear interpolation of matrices is defined as the element-wise operation given by Equation (16) for each i, j value from 1 to 4.

$$\alpha_y^{c_t} = \sigma_{IncA} \cdot \alpha_y^2 + \sigma_{WW} \cdot \alpha_y^3 \quad (16)$$

Although Alpha matrix interpolation is discussed with regard to the element-wise operation discussed, any other appropriate method of interpolation may be used.

The AS gain function $\vec{G}^{Full}$ in Equation (11) differs from the AS gain function $G_{color}^{Full}$ described earlier in that the matrix function $A(C_t)$ replaces the amplitude modulation coefficient $\alpha_{color}(C_t)$ and in that the AS gain function $\vec{G}^{Full}$ accounts for all color channels together, rather than calculating an AS gain function for each color channel.

Example embodiments provide methods and apparatuses for anti-shading (AS) correction with extended CCT dependency. Although some example embodiments are described separately, these example embodiments may be applied separately or in combination with one another in providing anti-shading correction.

At least one example embodiment provides methods and apparatuses for anti-shading (AS) correction based on a CCT dependent parametric component. Example embodiments provide AS correction for the entire range of illumination types with increased accuracy.

Example embodiments may also provide reduced memory requirements while maintaining accuracy and/or improved accuracy of the AS gain approximation while maintaining relatively low memory requirements. Example embodiments may also provide improved quality over conventional AS correction methods with relatively small overhead of memory and/or power consumption.

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for correcting shading effects in an image sensor including a plurality of pixels, the method comprising:
    modeling, at a processing unit of the image sensor, shading effects on at least one readout pixel of the image sensor based on a parametric component and at least one grid component selected from a plurality of grid anti-shading tables, the parametric component being dependent on at least one of a color channel corresponding to the readout pixel and a color correlated temperature of light incident on the at least one readout pixel, and each grid anti-shading table corresponding to a different range of correlated color temperatures; and
    correcting the shading effects on the at least one readout pixel based on the modeled shading effects.

2. The method of claim 1, wherein the parametric component is a dynamic parametric component that is dependent on the color channel corresponding to the at least one readout pixel, and wherein the modeling includes,
calculating an anti-shading gain function for the color channel corresponding to the readout pixel, and wherein the shading effects are corrected using the calculated anti-shading gain function.

3. The method of claim 2, wherein the correcting of the shading effects comprises:
applying, to image data corresponding to the at least one readout pixel, the calculated anti-shading gain function for the color channel corresponding to the at least one readout pixel.

4. The method of claim 3, further comprising:
at least one of displaying and storing the image data corresponding to the readout pixel.

5. The method of claim 2, wherein the dynamic parametric component is a multi-dimensional parametric component.

6. The method of claim 1, wherein the parametric component is dependent upon the color correlated temperature of light incident on the at least one readout pixel, and wherein the modeling includes,
calculating a current parametric vector for the color channel corresponding to the at least one readout pixel based on the color correlated temperature of the light incident on the at least one readout pixel, and
calculating the parametric component based on the current parametric vector.

7. The method of claim 6, wherein the modeling comprises:
calculating an anti-shading gain function based on the parametric component, and wherein
the shading effects are corrected using the calculated anti-shading gain function.

8. The method of claim 7, wherein the correcting of the shading effects comprises:
applying the calculated anti-shading gain function to image data corresponding to the at least one readout pixel.

9. A method for correcting shading effects in an image sensor including a plurality of pixels, the method comprising:
selecting at least one grid component from at least one of at least two grid anti-shading tables based on a color correlated temperature of light incident on at least one readout pixel, each grid anti-shading table corresponding to a different range of correlated color temperatures;
modeling, at a processing unit of an image sensor, shading effects on the at least one readout pixel based on the at least one selected grid component; and
correcting the shading effects on the at least one readout pixel based on the modeled shading effects.

10. The method of claim 9, wherein the modeling further comprises:
calculating an anti-shading gain function based on the at least one selected grid component.

11. The method of claim 10, wherein the correcting of the shading effects comprises:
applying the calculated anti-shading gain function to image data corresponding to the at least one readout pixel.

12. The method of claim 11, further comprising:
at least one of displaying and storing the image data.

13. The method of claim 10, wherein a grid component is selected from each of the at least two grid anti-shading tables, the method further including,
calculating an interpolated grid component based on the selected grid components, and wherein the shading effects are modeled based on the interpolated grid component.

14. The method of claim 13, wherein the interpolated grid component is calculated based on the selected grid components and at least two interpolation weights.

15. The method of claim 14, wherein the at least two interpolation weights are determined based on the color correlated temperature of the light incident on the at least one readout pixel.

16. A method for correcting shading effects in image sensors, the method comprising:
modeling, at a processing unit of an image sensor, the shading effects in the image sensor by calculating an anti-shading gain function as a function of all color channels of the image sensor; and
correcting the shading effects in the image sensor by applying the calculated anti-shading gain function to each readout pixel of the image sensor; wherein
the anti-shading gain function is calculated based on a current Alpha matrix, which is a function of a plurality of Alpha matrices associated with a set of basic color correlated temperature nodes.

17. The method of claim 16, further comprising:
at least one of displaying and storing image data corresponding to the readout pixel.

18. An anti-shading correction apparatus comprising:
an image signal processor configured to model shading effects on at least one readout pixel of an image sensor based on a parametric component and at least one grid component selected from a plurality of grid anti-shading tables, each grid anti-shading table corresponding to a different range of correlated color temperatures, the image signal processor being further configured to correct shading effects on the at least one readout pixel based on the modeled shading effects; wherein
the parametric component is dependent on at least one of a color channel corresponding to the at least one readout pixel and a color correlated temperature of light incident on the at least one readout pixel.

19. The apparatus of claim 18, wherein the parametric component is a dynamic parametric component that is dependent on the color channel corresponding to the at least one readout pixel, and wherein the image signal processor is further configured to calculate an anti-shading gain function for the color channel corresponding to the readout pixel, and correct the shading effects using the calculated anti-shading gain function.

20. The apparatus of claim 19, wherein the image signal processor corrects the shading effects by applying the calculated anti-shading gain function to image data corresponding to the at least one readout pixel.

21. The apparatus of claim 18, wherein the parametric component is dependent on the color correlated temperature of light incident on the at least one readout pixel, and wherein the image signal processor is further configured to calculate a current parametric vector for the color channel corresponding to the at least one readout pixel based on the color correlated temperature of the light incident on the at least one readout pixel, and calculate the parametric component based on the current parametric vector.

22. The apparatus of claim 21, wherein the image signal processor is configured to calculate an anti-shading gain function based on the parametric component, and correct the shading effects using the calculated anti-shading gain function.

23. The apparatus of claim 22, wherein the image signal processor corrects the shading effects by applying the calculated anti-shading gain function to image data corresponding to the at least one readout pixel.

24. An anti-shading correction apparatus comprising:
an image signal processor configured to,
select at least one grid component from at least one of at least two grid anti-shading tables based on a color correlated temperature of light incident on at least one readout pixel, each grid anti-shading table corresponding to a different range of correlated color temperatures;
model shading effects on the at least one readout pixel based on the at least one selected grid component; and
correct the shading effects on the at least one readout pixel based on the modeled shading effects.

25. The apparatus of claim 24, wherein the image signal processor models the shading effects by calculating an anti-shading gain function based on the at least one selected grid component.

26. The apparatus of claim 25, wherein the image signal processor corrects the shading effects by applying the calculated anti-shading gain function to image data corresponding to the at least one readout pixel.

27. The apparatus of claim 24, wherein the image signal processor selects a grid component from each of the at least two grid anti-shading tables, calculates an interpolated grid component based on the selected grid components, and models the shading effects based on the interpolated grid component.

28. The apparatus of claim 27, wherein the interpolated grid component is calculated based on the selected grid components and at least two interpolation weights.

29. An anti-shading correction apparatus comprising:
an image signal processor configured to model shading effects in an image sensor by calculating an anti-shading gain function as a function of all color channels of the image sensor, and configured to correct the shading effects in the image sensor by applying the calculated anti-shading gain function to each readout pixel of the image sensor; wherein
the anti-shading gain function is calculated based on a current Alpha matrix, which is a function of a plurality of Alpha matrices associated with a set of basic color correlated temperature nodes.

* * * * *